United States Patent
Crandall et al.

(10) Patent No.: US 9,606,671 B2
(45) Date of Patent: Mar. 28, 2017

(54) CAPACITIVE SENSING DEVICE CAPABLE OF ELIMINATING INFLUENCE FROM MUTUAL CAPACITANCE AND OPERATING METHOD THEREOF

(71) Applicant: PIXART IMAGING INC., Hsin-Chu County (TW)

(72) Inventors: Kenneth Crandall, Santa Clara, CA (US); Thomas Patrick Murphy, Santa Clara, CA (US); Hsin-Chia Chen, Santa Clara, CA (US)

(73) Assignee: PIXART IMAGING INC., Hsin-Chu County (TW)

( * ) Notice: Subject to any disclaimer, the term of this patent is extended or adjusted under 35 U.S.C. 154(b) by 142 days.

(21) Appl. No.: 14/697,923

(22) Filed: Apr. 28, 2015

(65) Prior Publication Data
US 2016/0320911 A1 Nov. 3, 2016

(51) Int. Cl.
G06F 3/045 (2006.01)
G06F 3/041 (2006.01)
G06F 3/044 (2006.01)

(52) U.S. Cl.
CPC ............ *G06F 3/0418* (2013.01); *G06F 3/044* (2013.01)

(58) Field of Classification Search
CPC .................................................. G06F 3/0418
USPC ........................................................ 345/174
See application file for complete search history.

(56) References Cited

U.S. PATENT DOCUMENTS

| 8,067,948 B2 | 11/2011 | Sequine | |
|---|---|---|---|
| 8,121,283 B2 | 2/2012 | Peng et al. | |
| 8,319,505 B1 | 11/2012 | Maharyta | |
| 8,358,142 B2 | 1/2013 | Maharyta | |
| 2006/0017701 A1* | 1/2006 | Marten | G06F 3/044 345/173 |
| 2010/0096193 A1* | 4/2010 | Yilmaz | G06F 3/044 178/18.06 |
| 2015/0130755 A1* | 5/2015 | Jain | G06F 3/0416 345/174 |
| 2015/0346889 A1* | 12/2015 | Chen | G06F 3/0416 345/174 |

\* cited by examiner

*Primary Examiner* — Jason Olson
(74) *Attorney, Agent, or Firm* — Hauptman Ham, LLP (57) ABSTRACT

A capacitive sensing device including a touch panel and a controller chip is provided. The touch panel includes a plurality of first electrodes and a plurality of second electrodes. The controller chip includes a plurality of input capacitors and a plurality of output resistors. The input capacitors are selectively coupled to signal inputs of the first electrodes and the second electrodes, respectively. The output resistors are respectively coupled to signal outputs of the first electrodes and the second electrodes. The input capacitors and the output resistors are configured to form bridge circuits to suppress the influence of mutual capacitance between the first electrodes and the second electrodes.

21 Claims, 8 Drawing Sheets

CAPACITIVE SENSING DEVICE CAPABLE OF ELIMINATING INFLUENCE FROM MUTUAL CAPACITANCE AND OPERATING METHOD THEREOF

BACKGROUND

1. Field of the Disclosure

This disclosure generally relates to a touch device and, more particularly, to a capacitive sensing device capable of suppressing the influence from the mutual capacitance in a self-capacitance mode.

2. Description of the Related Art

As a touch panel can be operated instinctively by a user, it is widely applied to various electronic devices. Touch panels are generally divided into capacitive, resistive and optical touch panels.

The capacitive touch sensor can further be divided into the self-capacitive touch sensor and the mutual capacitive touch sensor. These two types of touch sensors have different characteristics of capacitance variation to be adaptable to different applications. For example, the mutual capacitive touch sensor may be configured to perform the multi-touch detection, whereas the self-capacitive touch sensor has a higher sensitivity to the hovering operation and a lower sensitivity to water drops.

For improving the usability, some capacitive sensing devices may be operated in a self-capacitance mode and a mutual capacitance mode for different scenarios or applications, respectively. However, the operation in the self-capacitance mode can be easily influenced by the mutual capacitance to lose the high sensitivity to the hovering operation or the low sensitivity to water drops.

SUMMARY

Accordingly, the present disclosure provides a capacitive sensing device capable of suppressing the influence from the mutual capacitance in a self-capacitance mode thereby improving the identification accuracy in the self-capacitance mode.

The present disclosure provides a capacitive sensing device in which at least one input capacitor is further arranged in a controller chip thereof so as to detect a touch event based on a voltage division method in the self-capacitance mode by using a capacitance in series with the shunt capacitance.

The present disclosure provides a capacitive sensing device in which at least one input capacitor and at least one output resistor are further arranged in a controller chip thereof so as to form a bridge circuit for suppressing the influence from the mutual capacitance.

The present disclosure provides a capacitive sensing device which modulates detection signals with two signals and calculates norm of vectors of the modulated detection signals so as to deal with the signal phase shift caused by different lengths of the signal lines.

The present disclosure provides a capacitive sensing device which performs the narrow band filtering in a digital back end thereof so as to improve the noise immunity.

The present disclosure provides a capacitive sensing device including a touch panel and a controller chip. The touch panel includes a plurality of first electrodes and a plurality of second electrodes. The controller chip includes an analog front end, a plurality of input capacitors, a plurality of drive circuits and a plurality of output resistors. The input capacitors are respectively configured to be coupled to signal inputs of the first electrodes and the second electrodes. The drive circuits are configured to simultaneously input a drive signal to the first electrodes and the second electrodes respectively via the input capacitors. The output resistors are respectively configured to be coupled to signal outputs of the first electrodes and the second electrodes, wherein in a self-capacitance mode the output resistor corresponding to a detected electrode is coupled to the analog front end and the rest of the output resistors are coupled to a constant voltage source.

The present disclosure further provides an operating method of a capacitive sensing device. The capacitive sensing device includes a touch panel and a controller chip, wherein the touch panel includes a plurality of first electrodes and a plurality of second electrodes, the controller chip includes a plurality of output resistors and an analog front end, and the output resistors are respectively coupled to signal outputs of the first electrodes and the second electrodes. The operating method includes: coupling, in a self-capacitance mode, the output resistor corresponding to a detected electrode to the analog front end and coupling rest of the output resistors to a constant voltage source; and sequentially coupling, in a mutual capacitance mode, the output resistors to the analog front end.

The present disclosure further provides a capacitive sensing device including a touch panel and a controller chip. The touch panel includes a plurality of first electrodes and a plurality of second electrodes. The controller chip includes an input capacitor, a drive circuit and an output resistor. The input capacitor is simultaneously coupled to signal inputs of the first electrodes and the second electrodes. The drive circuit is configured to input a drive signal to the first electrodes and the second electrodes via the input capacitor. The output resistor is simultaneously coupled to signal outputs of the first electrodes and the second electrodes.

The present disclosure further provides a controller chip adaptable to a capacitive sensing device. The controller chip includes a plurality of pins, an analog front end, a plurality of input capacitors, a plurality of drive circuits and a plurality of output resistors. The plurality of pins is configured as an interface to external circuits. The plurality of input capacitors is respectively configured to be coupled to a first part of the plurality of pins. The plurality of drive circuits is respectively configured to input a drive signal to the input capacitors. The plurality of output resistors is respectively configured to be coupled to a second part of the plurality of pins, wherein in a self-capacitance mode, one of the output resistors is coupled to the analog front end and rest of the output resistors are coupled to a constant voltage source; in a self-capacitance mode, the output resistors are sequentially coupled to the analog front end and the input capacitors are bypassed.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
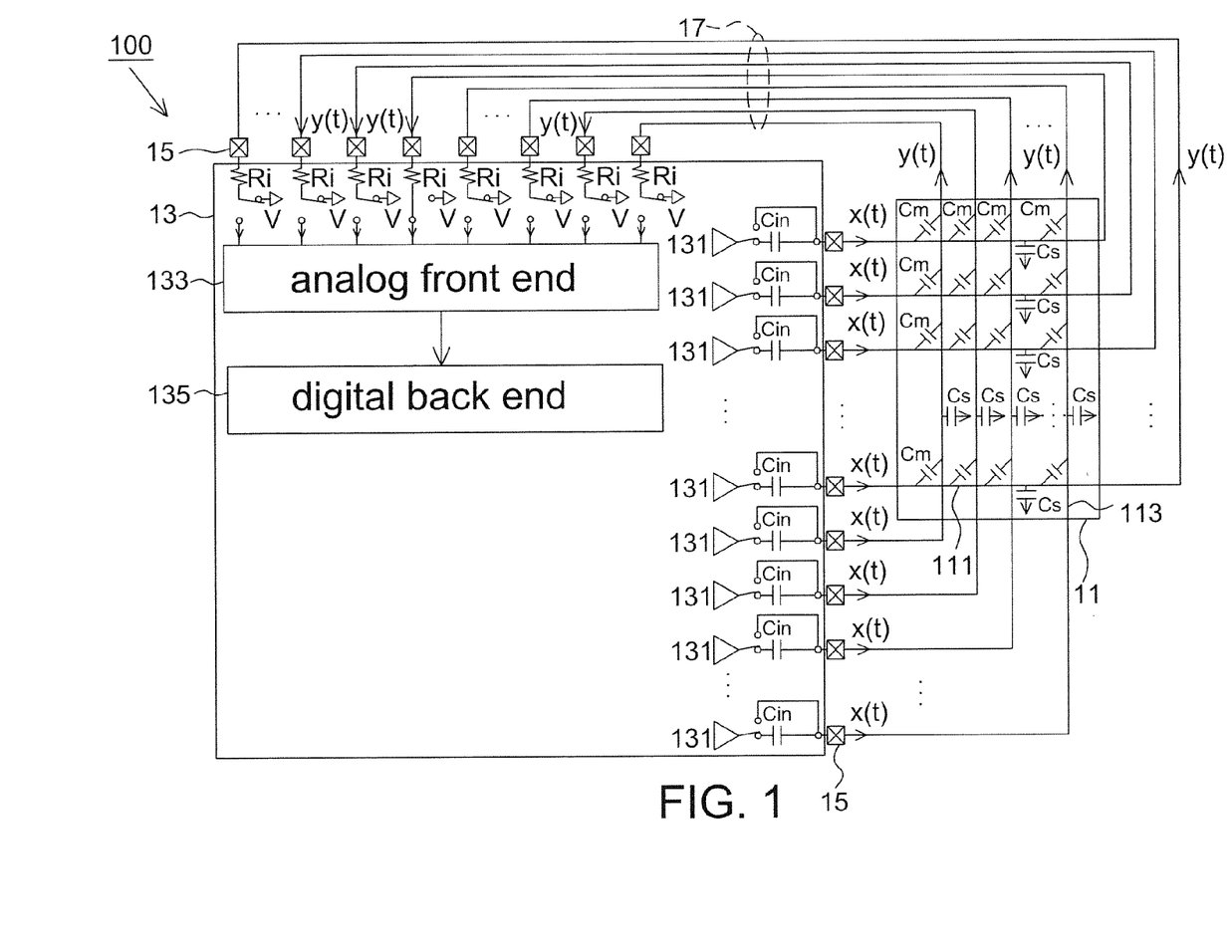
FIG. 1 is a schematic diagram of a capacitive sensing device according to a first embodiment of the present disclosure.

Referring to FIG. 1, it is a schematic diagram of a capacitive sensing device according to a first embodiment of the present disclosure. The capacitive sensing device 100 includes a touch panel 11 and a controller chip 13, wherein the controller chip 13 is coupled to the touch panel 11 via a plurality of pins 15 and a plurality of signal lines 17. The capacitive sensing device 100 preferably is a dual-mode sensing device, e.g. having at least a mutual-capacitance mode and a self-capacitance mode.

The touch panel 11 includes a plurality of first electrodes 111 (shown as extending transversely and parallel to each other) and a plurality of second electrodes 113 (shown as extending longitudinally and parallel to each other). It should be mentioned that although FIG. 1 shows that the first electrodes 111 and the second electrodes 113 are perpendicular to each other, the present disclosure is not limited thereto as long as the mutual capacitance Cm is formed between the first electrodes 111 and the second electrodes 113. The mutual capacitance Cm is configured as the sensing mechanism in the mutual capacitance mode.

The controller chip 13 includes the pins 15, a plurality of input capacitors Cin, a plurality of drive circuits 131, a plurality of output resistors Ri, an analog front end 133, a digital back end 135 and a plurality of switching devices. The pins 15 are configured as the interface connecting to external circuits. The input capacitors Cin are respectively configured to be coupled to a first part of the plurality of pins 15, e.g. via a plurality of switching devices. The drive circuits are respectively configured to input a drive signal to the input capacitors Cin. The output resistors Ri are respectively configured to be coupled to a second part of the plurality of pins 15, e.g. via a plurality of switching devices, wherein the first part of the plurality of pins 15 are different from the second part of the plurality of pins 15. It is appreciated that not all the pins 15 are connected to the first electrodes 111 and the second electrodes 113, i.e. the controller chip 13 having other functional pins. The input capacitors Cin are respectively configured to be coupled to signal inputs of the first electrodes 111 and the second electrodes 113 via a plurality of switching devices (e.g. transistor switches, but not limited to) and the first part of the plurality of pins 15. The output resistor Ri are respectively coupled to signal outputs of the first electrodes 111 and the second electrodes 113 via the second part of the plurality of pins 15, and selectively coupled to the analog front end 133 or a constant voltage source (e.g. 0.9 volts, but not limited to) via a plurality of switching devices (e.g. transistor switches, but not limited to).

The drive circuits 131 are, for example, signal generators and configured to input a drive signal x(t) to the first electrodes 111 and the second electrodes 113 respectively via the input capacitors Cin and the first part of the plurality of pins 15. The drive circuits 131 respectively generate an AC signal, e.g. a sinusoidal signal or square wave, to be served as the drive signal x(t). A detected electrode, which is one of the first electrodes 111 or the second electrodes 113, of the touch panel 11 then induces and outputs an AC detection signal y(t) to the controller chip 13.

In a mutual capacitance mode, for example the first electrodes 111 are drive electrodes and the second electrodes 113 are receiving electrodes. When an object (e.g. a finger, a stylus or other conductors) approaches the touch panel 11, the mutual capacitance Cm is affected to further change the AC detection signal y(t), and the controller chip 13 identifies touch events and/or touch coordinates according to a variation of the detection signal (e.g. a variation of the peak-to-peak voltage). The principle of the mutual capacitance Cm affected by an approaching object is known to the art and thus details thereof are not described herein.

In the mutual capacitance mode, the controller chip 13 bypasses the input capacitors Cin using a plurality of switching devices, and the drive circuits 131 corresponding to the first electrodes 111 sequentially or simultaneously input (without passing the input capacitors Cin) the drive signal x(t) into the first electrodes 111, wherein it is assumed that the first electrodes 111 are drive electrodes herein. For example, if the switching devices are switched on, the controller chip 13 is coupled to the first electrodes 111 via the input capacitors Cin; whereas if the switching devices are switched off, the controller chip 13 is coupled to the first electrodes 111 without passing through (i.e. bypass) the input capacitors Cin. An AC detection signal is induced on the second electrodes 113 via the mutual capacitance Cm according to the drive signal x(t), wherein it is assumed that the second electrodes 113 are receiving electrodes 113 herein. The Ac detection signal y(t) is inputted into the analog front end 113 via the output resistor Ri corresponding to a detected second electrode 113 (e.g. the controller chip 13 sequentially detecting the second electrodes 113). The analog front end 113 performs the amplifying and filtering, but not limited to, on the AC detection signal y(t) to generate a processed detection signal. The digital back end 135 then identifies a touch event and/or a touch coordinate according to a peak-to-peak variation of the processed detection signal. In the mutual capacitance mode, the output resistors Ri are configured to decrease the loading difference between different detected electrodes thereby increasing the uniformity between the AC detection signals y(t) outputted by different detected electrodes.

In a self-capacitance mode, each of the first electrodes 111 and the second electrodes 113 forms a self-capacitance Cs with respect to the earth ground. When an object (e.g. a finger, a stylus or other conductors) approaches the touch panel 11, the self-capacitance Cs is affected to further change the AC detection signal y(t), and the controller chip 13 then identifies touch events and/or touch coordinates according to a variation of the detection signal (e.g. a variation of the peak-to-peak voltage). In some embodiments, the first electrodes 111 and the second electrodes 113 are both served as detected electrodes; and in some embodiments, only the first electrodes 111 or the second electrodes 113 are served as detected electrodes depending on the applications thereof. For example, if the self-capacitance mode is used to detect a touch event but not to calculate a touch coordinate, only at least a part of the first electrodes 111 or at least a part of the second electrodes 113 are served as the detected electrodes; whereas, if the self-capacitance mode is also used to calculate a rough coordinate, at least a part of the first electrodes 111 and at least a part of the second electrodes 113 are both served as the detected electrodes. The principle of the self-capacitance Cs affected by an approaching object is known to the art and thus details thereof are not described herein.

Figure 2:
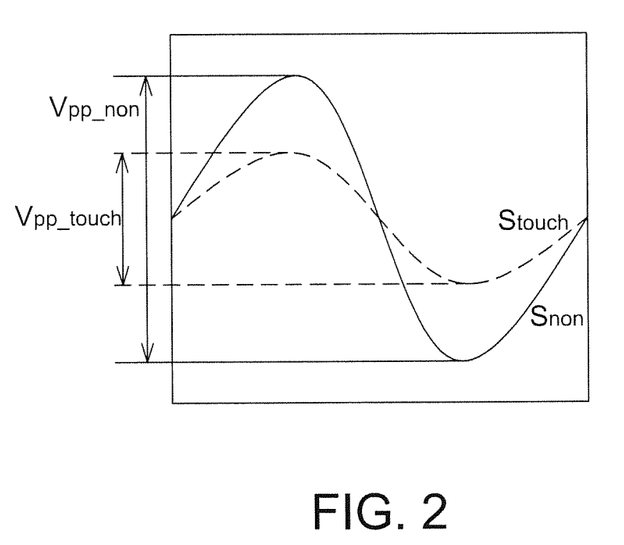
FIG. 2 is a schematic diagram of detection signals according to some embodiments of the present disclosure.

In the self-capacitance mode, the input capacitors Cin are coupled between the drive circuits 131 and the first electrodes 111 as well as the second electrodes 113 via the switching devices, i.e. all the first electrodes 111 and the second electrodes 113 receiving the drive signal x(t). The output resistor Ri corresponding to a detected electrode is coupled to the analog front end 133 and the rest of the output resistors Ri are coupled to a constant voltage source V, e.g. FIG. 1 showing that the output resistor Ri corresponding to a first of the first electrodes 111 is coupled to the analog front end 133 and the output resistors Ri corresponding to other first electrodes 111 and the second electrodes 113 are coupled to the constant voltage source V. An AC detection signal y(t) is induced via the self-capacitance Cs of the first of the first electrodes 111 according to the drive signal x(t). The analog front end 113 is configured to perform the amplifying and filtering, but not limited to, on the AC detection signal y(t) to generate a processed detection signal. The digital back end 135 then identifies a touch event and/or a touch coordinate according to a peak-to-peak variation of the processed detection signal. For example, FIG. 2 are schematic diagrams of a touched detection signal $S_{touch}$ and a non-touched detection signal $S_{non}$ of the AC detection signal y(t) or the processed detection signal, wherein the non-touched detection signal $S_{non}$ has a peak-to-peak value $S_{pp\_non}$ and the touched detection signal $S_{touch}$ has a peak-to-peak value $S_{pp\_touch}$. The digital back end 135 then performs the identification according to a variation (i.e. difference) between $S_{pp\_non}$ and $S_{pp\_touch}$. A ratio of the variation may determine the detection sensitivity. It should be mentioned that the peak-to-peak value $S_{pp\_touch}$ may be larger than the peak-to-peak value $S_{pp\_non}$ corresponding to different objects.

Figure 3:
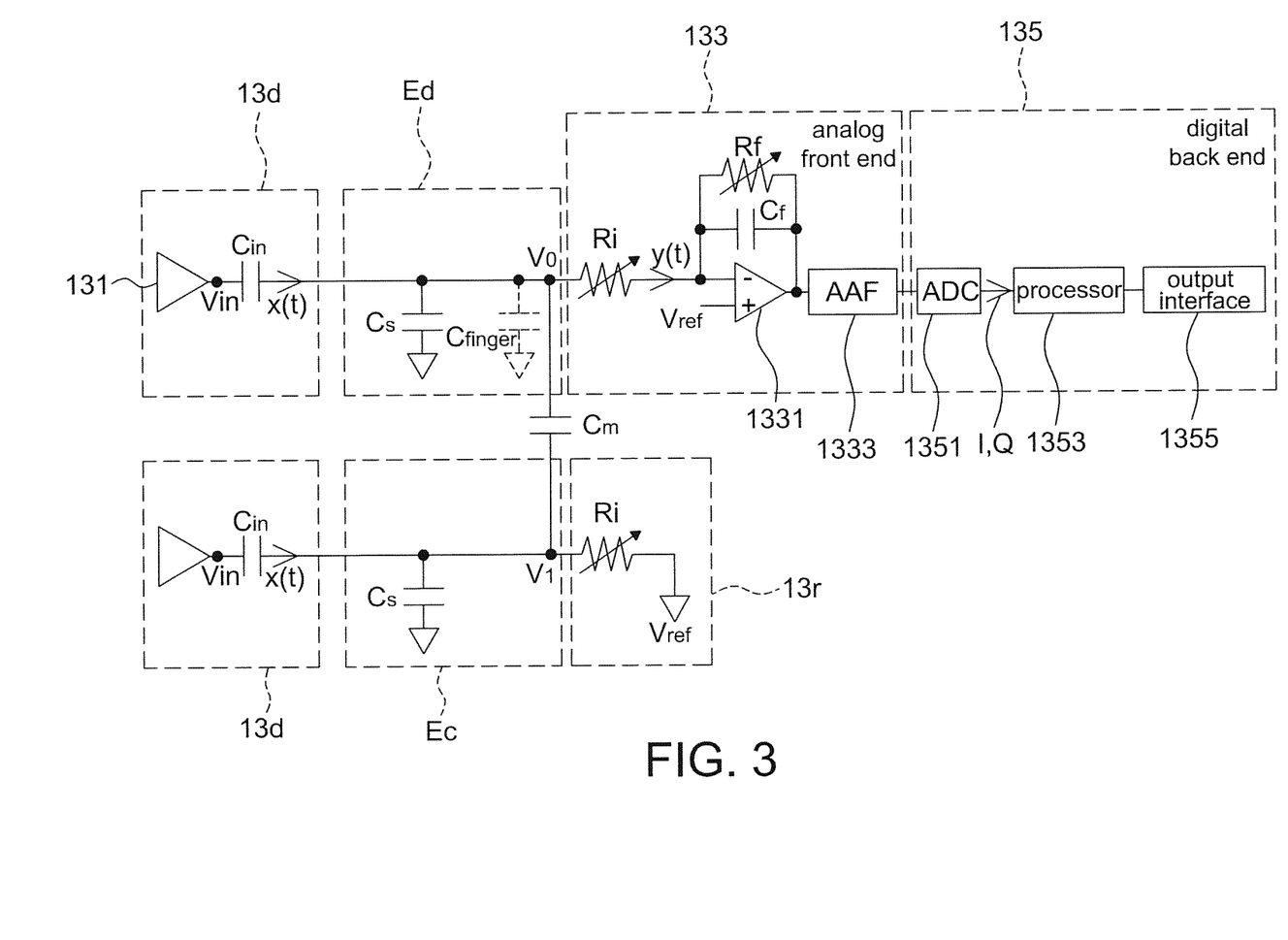
FIG. 3 is a partial schematic diagram of the capacitive sensing device according to the first embodiment of the present disclosure.
Figure 4:
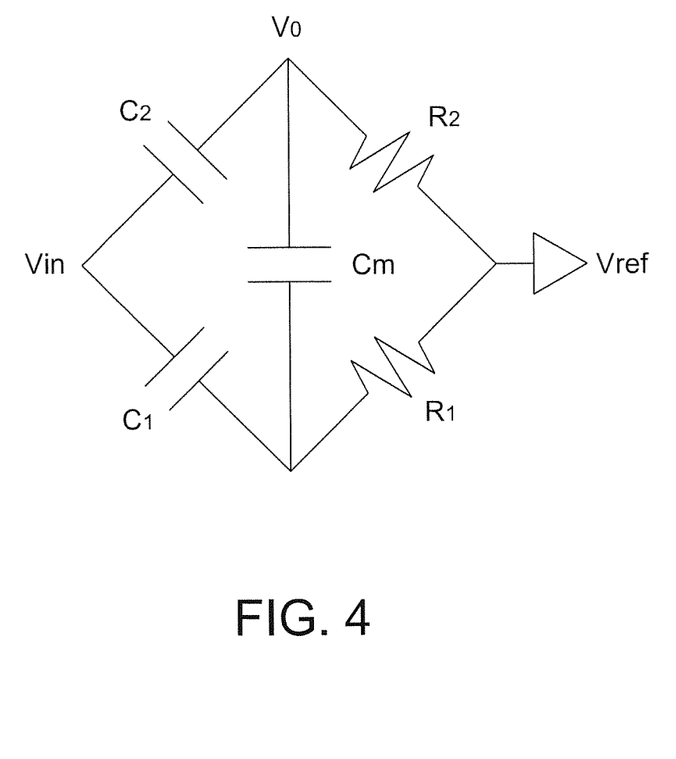
FIG. 4 is a schematic diagram of a bridge circuit formed by the capacitive sensing device according to the first embodiment of the present disclosure.

Referring to FIG. 3, it is a partial schematic diagram of the capacitive sensing device according to the first embodiment of the present disclosure, which is used to describe the operation of the self-capacitance mode. As mentioned above, in the self-capacitance mode a drive end 13d (e.g. including a drive circuit 131 and an input capacitor Cin) inputs an AC drive signal x(t) into a detected electrode Ed (e.g. one of the first electrodes 11)), and a mutual capacitance Cm is formed between the detected electrode Ed and a coupling electrode Ec (e.g. one of the second electrodes 113), and the mutual capacitance Cm can affect the induced AC detection signal y(t) on the detected electrode Ed. Meanwhile, the coupling electrode Ec also receives the drive signal x(t). Accordingly, by arranging the input capacitors Cin and the output resistors Ri in the controller chip 13, a bridge circuit shown in FIG. 4 is formed by the input capacitor Cin and the output resistor Ri corresponding to the detected electrode Ed, the input capacitor Cin and the output resistor Ri corresponding to the coupling electrode Ec as well as the mutual capacitance Cm. The output/input ratio of the bridge circuit in FIG. 4 is indicated by equation (1)

$$Vo/Vin=[(sC_1+sCm+1/R_1)\times(sC_2)+(sC_1)\times(sCm)]/[(sC_1+sCm+1/R_1)\times(sC_2+1/R_2)+(sC_1+1/R_1)\times(sCm)] \quad (1)$$

wherein when $C_1=C_2=Cin$ and $R_1R_2=Ri$, equation (1) is indicated by equation (2)

$$Vo/Vin(sCin)/(sCin+1/Ri) \quad (2)$$

It is clear from equation (2) that the AC detection signal y(t) outputted by the detected electrode Ed is not affected by the mutual capacitance Cm when the input resistors Cin are identical and the output resistors Ri are identical. Accordingly, the detection accuracy in the self-capacitance mode is increased.

In this embodiment, the input capacitor Cin is connected with the self-capacitance Cs in series. For example, when a finger approaches the self-capacitance Cs, the self-capacitance Cs is changed to an equivalent capacitance consisting of the self-capacitance Cs and the finger capacitance $C_{finger}$. Accordingly, according to the voltage division, the peak-to-peak value of the AC detection signal y(t) on the node Vo changes as shown in FIG. 2.

Referring to FIG. 3 continuously, the analog front end 133 at least includes an amplification unit and a filter 1333. The amplification unit is, for example, an integrated programmable gain amplifier (IPGA) configured to amplify the AC detection signal y(t). The filter 1333 is, for example, an anti-aliasing filter (AAF) configured to filter the amplified AC detection signal, wherein the operation of the amplifier 1333 is known to the art and thus details thereof are not described herein.

In one embodiment, the amplification unit includes an operational amplifier 1331, a feedback resistor Rf and a compensation capacitor Cf. The operational amplifier 1331 has a positive input (+), a negative input (−) and an output. The feedback resistor Rf connects between the negative input (−) and the output of the operational amplifier 1331. The compensation capacitor Cf connects between the negative input (−) and the output of the operational amplifier 1331. In this embodiment, the negative input (−) is coupled to the output resistor Ri corresponding to the detected electrode Ed, and the positive input (+) is coupled to a constant voltage source Vref. In one embodiment, the constant voltage source Vref is identical to the constant voltage source V (shown in FIG. 1). The feedback resistor Rf and the output resistor Ri corresponding to the detected electrode Ed may be configured to adjust a signal gain Rf/Ri (analog gain) and configured as a bandpass filter for filtering the AC detection signal y(t).

The digital back end 135 includes an analog-to-digital converter (ADC) 1351, a processor 1353 and an output interface 1355. The ADC 1351 is configured to digitize a processed detection signal (e.g. an analog AC signal) outputted by the analog front end 133. The processor 1353 is, for example, a digital signal processor (DSP), a central processing unit (CPU), a microcontroller (MCU) or the like, and configured to identify touch events and/or touch coordinates according to the digital detection signal. The output interface 1355 is configured to wired or wirelessly output an identification result to correspondingly control an electronic device, e.g. outputting a cursor coordinate or a cursor displacement to a display to be shown, but not limited thereto. The function to be controlled by the identification result is determined according to different applications. In addition, the digital back end 135 further performs the narrow band filtering on the digital detection signal so as to improve the identification accuracy. The narrow band filtering may be indicated by equations (3) and (4), $$f_{symbol} = f_{drive}/\text{drive cycles;} \quad (3)$$

$$BW = 2 \times f_{symbol}; \quad (4)$$

where $f_{drive}$ is the drive frequency, $f_{symbol}$ is the symbol frequency and BW is the bandwidth of output signal. With more drive cycles, the signal bandwidth is narrower according to equations (3) and (4). Meanwhile, filters with narrow band such as Boxar filter, CIC (Cascaded Integrator-comb) filter, and Nyquist filter can be used to further shape the output response with up to 50 dB out-band noise suppression ratio or more.

Figure 5A:
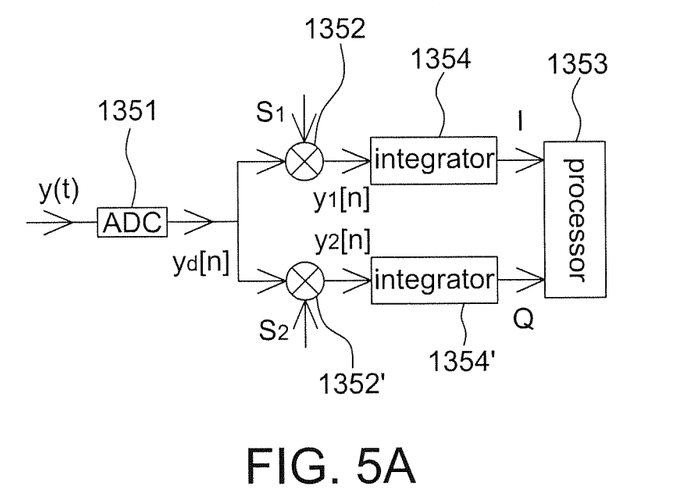
FIGS. 5A-5B are schematic diagrams of modulating a detection signal according to some embodiments of the present disclosure.
Figure 5B:
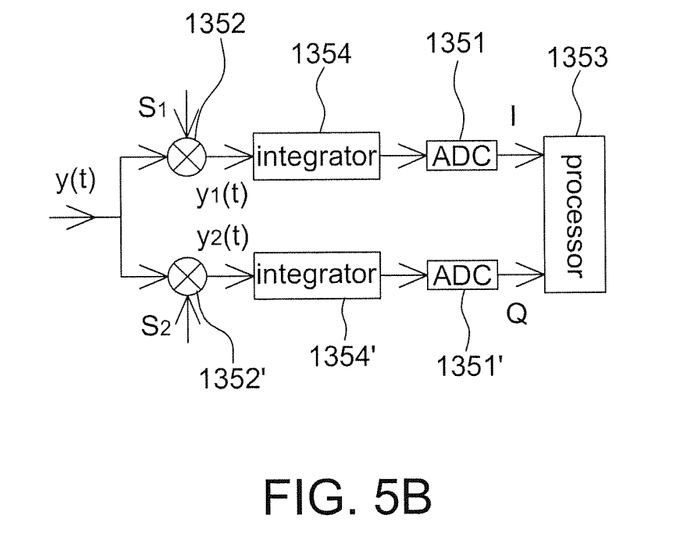

Referring to FIGS. 5A-5B, in some embodiments, in order to deal with signal phase shift caused by different lengths of signal lines, the digital back end 135 utilizes two signals $S_1$ and $S_2$ to respectively modulate the processed detection signal, which is an amplified and filtered AC detection signal and also shown as y(t) herein for simplification, to generate a pair of modulated detection signals to be served as two components I and Q of a two-dimensional detection vector. The two signals $S_1$ and $S_2$ are orthogonal or non-orthogonal continuous signals, e.g. a sine signal $\sqrt{2/T} \cos(\omega t)$ and a cosine signal $\sqrt{2/T} \sin(\omega t)$. In some embodiments, the two signals $S_1$ and $S_2$ are two vectors, e.g. [1 0 −1 0] and [0 −1 0 1]. Preferably, the two signals $S_1$ and $S_2$ have different phases.

The processor 1353 is configured to calculate an magnitude of the pair of modulated detection signals, i.e. calculating a norm of vector of the two-dimensional detection vector (I,Q), to be served as a touch identification signal, and compare the touch identification signal (i.e. the norm of vector) with a threshold TH so as to identify a touch event. In one embodiment, the processor 1353 obtains the norm of vector $R = \sqrt{I^2 + Q^2}$ by software. In another embodiment, the processor 1353 calculates by hardware or firmware, e.g. calculating the norm of vector $R = \sqrt{i^2 + q^2}$ using so called coordinate rotation digital computer (CORDIC) shown in FIG. 6, wherein CORDIC is a known fast algorithm. For example, when there is no object approaching the touch panel 11, it is assumed that the norm of vector obtained by the processor 1353 is R; when an object approaches the touch panel 11, the norm of vector is reduced to R'; and when the norm of vector R' is smaller than the threshold TH, the processor 1353 identifies that an object is close to the detected electrode Ed to cause a touch event. In other embodiments, some objects, e.g. a metal plate, can increase the norm of vector R when approaching the touch panel 11. Accordingly, the processor 1353 may identify a touch event when the norm of vector changes to exceed a predetermined threshold.

In some embodiments, the processor 1353 may perform coding on the two components I and Q of the two-dimensional detection vector by using quadrature amplitude-shift keying (QASK), such as 16-QASK. A part of the codes may be corresponded to the touch event and the other part of the codes may be corresponded to the non-touch state and these codes are previously saved in the processor 1353. When the processor 1353 calculates the QASK code of two current components I and Q according to the modulated detection signals, it is able to identify that whether an object is present near the touch panel 11.

FIGS. 5A and 5B are schematic diagrams of modulating the detection signal y(t) according to some embodiments of the present disclosure.

In FIG. 5A, the digital back end 135 includes two multipliers 1352 and 1352', two integrators 1354 and 1354', an analog-to-digital converter (ADC) 1351, and is configured to process the detection signal y(t) to generate a two-dimensional detection vector (I,Q). The ADC 1351 is configured to digitize the detection signal y(t) to a digital detection signal $y_d[n]$. The two multipliers 1352 and 1352' are configured to modulate two signals $S_1$ and $S_2$ respectively with the digital detection signal $y_d[n]$ to generate a pair of modulated detection signals $y_1[n]$ and $y_2[n]$. In order to sample the pair of modulated detection signal $y_1[n]$ and $y_2[n]$, the two integrators 1354 and 1354' are used to integrate the pair of modulated detection signal $y_1[n]$ and $y_2[n]$ at first and then the sampling is performed so as to generate two digital components I and Q of the two-dimensional detection vector (I,Q). In this embodiment, these two integrators 1354 and 1354' may involve a narrow band filter to convolute $y_1[n]$ and $y_2[n]$ to generate two-dimensional detection vector (I,Q). A bandwidth of the AC signal can be reduced by using the integrators. In other embodiments, the integrators 1354 and 1354' are not included and the pair of modulated detection signals $y_1[n]$ and $y_2[n]$ are directly sampled. The processor 1353 then calculates a norm of vector of the two digital components I and Q to be served as a touch identification signal and identifies a touch event according to a peak-to-peak variation of the touch identification signal.

In FIG. 5B, the digital back end 135 includes two multipliers 1352 and 1352', two integrators 1354 and 1354' and two analog-to-digital converters (ADC) 1351 and 1351', and is configured to process the detection signal y(t) to generate a two-dimensional detection vector (I,Q). The two multipliers 1352 and 1352' are configured to modulate two signals $S_1$ and $S_2$ respectively with the detection signal y(t) to generate a pair of modulated detection signals $y_1(t)$ and $y_2(t)$. In order to sample the pair of modulated detection signals $y_1(t)$ and $y_2(t)$, the two integrators 1354 and 1354' are used to integrate the pair of modulated detection signals $y_1(t)$ and $y_2(t)$ at first and then the sampling is performed. In this embodiment, types of the two integrators 1354 and 1354' do not have particular limitations, e.g. implemented by capacitors. The two ADCs 1351 and 1351' are configured to digitize the pair of integrated and modulated detection signals $y_1(t)$ and $y_2(t)$ to generate two digital components I and Q of the two-dimensional detection vector (I,Q). In other embodiments, the integrators 1354 and 1354' are not included and the pair of modulated detection signals $y_1(t)$ and $y_2(t)$ are directly sampled. The processor 1353 then calculates a norm of vector of the two digital components I and Q to be served as a touch identification signal and identifies a touch event according to a peak-to-peak variation of the touch identification signal. It should be mentioned that although the modulation of the detection signal y(t) is performed in the digital back end 135 FIG. 5B, as in this embodiment the modulation process is performed before the two ADCs 1351 and 1351', said modulation process may be performed in the analog front end 133.

It is appreciated that when the two signals $S_1$ and $S_2$ are not used to modulate the detection signal y(t), the processor 1353 identifies a touch event directly according to a peak-to-peak variation of the detection signal y(t).

Figure 7:
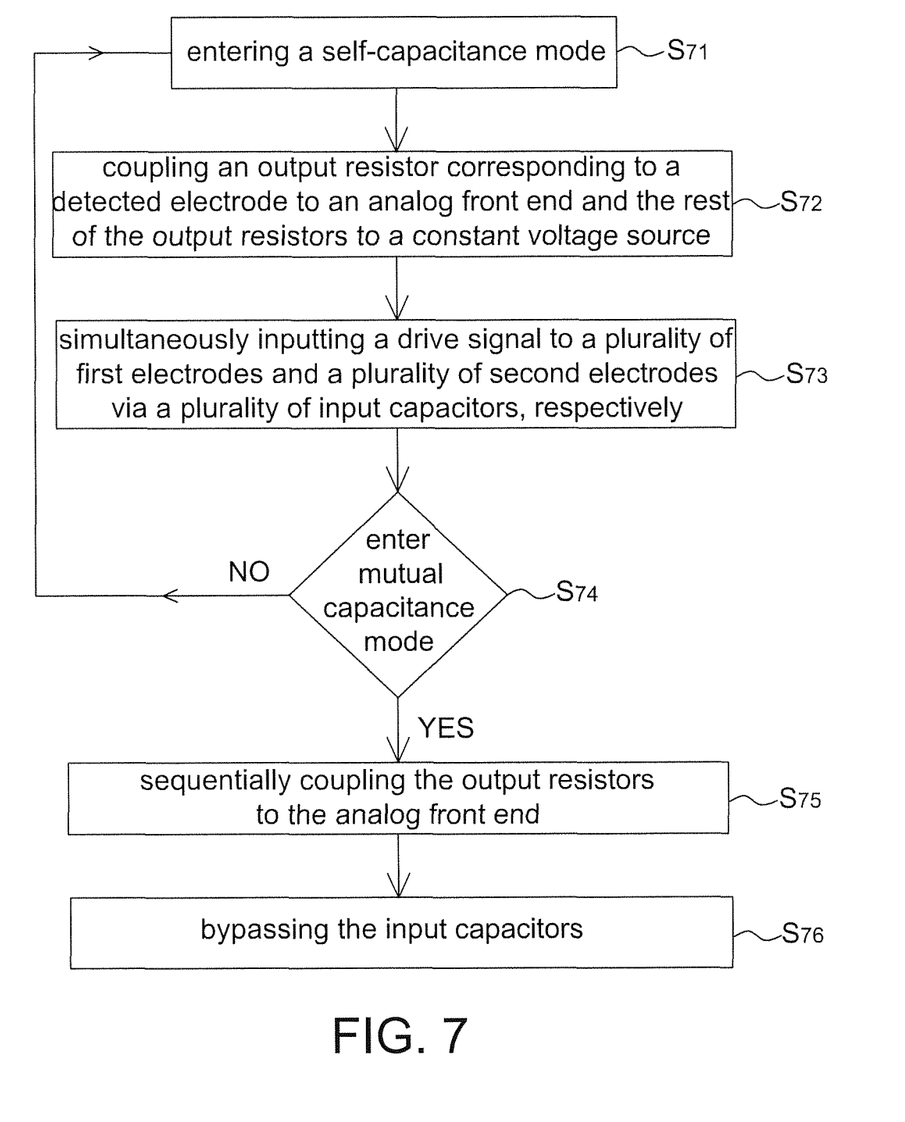
FIG. 7 is a flow chart of an operating method of the capacitive sensing device according to the first embodiment of the present disclosure.

Referring to FIG. 7, it is a schematic diagram of an operating method of the capacitive sensing device according to the first embodiment of the present disclosure. The operating method includes the following steps: entering a self-capacitance mode (Step $S_{71}$); in the self-capacitance mode, coupling an output resistor corresponding to a detected electrode to an analog front end and coupling the rest of the output resistors to a constant voltage source (Step $S_{72}$); simultaneously inputting a drive signal to a plurality of first electrodes and a plurality of second electrodes via a plurality of input capacitors, respectively (Step $S_{73}$); entering a mutual capacitance mode (Step $S_{74}$); in the mutual capacitance mode, sequentially coupling the output resistors to the analog front end (Step $S_{75}$); and bypassing the input capacitors (Step $S_{76}$).

In some embodiments, the self-capacitance mode is configured to, for example, identify a touch event or a rough touch position, and when the touch event occurs or the rough touch position is obtained, the mutual capacitance is entered so as to identify a fine position. When a sleep mode is entered from the mutual capacitance mode, the self-capacitance mode is firstly entered after the sleep mode is ended. The definition and the method of ending the sleep mode are known to the art and thus details thereof are not described herein.

Referring to FIGS. 1-7 together, details of the operating method of the capacitive sensing device 100 are illustrated hereinafter.

Steps $S_{71}$-$S_{72}$: The capacitive sensing device 100 enters a self-capacitance mode at first. In the self-capacitance mode, an output resistor Ri corresponding to a detected electrode Ed (e.g. one of the first electrodes 111 or the second electrodes 113) is coupled to an analog front end 133 and the rest of the output resistors Ri are coupled to a constant voltage source V, as shown in FIG. 1.

Steps $S_{73}$: A plurality of drive circuits 131 respectively input a drive signal x(t) via a plurality of input capacitors Cin to signal inputs of a plurality of first electrodes 111 and a plurality of second electrodes 113. As mentioned above, the input capacitors Cin are coupled between the drive circuits 131 and the first electrodes 111 as well as the second electrodes 113 via a plurality of switching devices and the associated pins 15 in the self-capacitance mode. In this embodiment, the drive signal x(t) is an AC signal.

Accordingly, the controller chip 13 may sequentially detect the first electrodes 111 and/or the second electrodes 113 according to different applications. The self-capacitance Cs of a detected electrode Ed induces an AC detection signal y(t), which is outputted to the analog front end 133, according to the drive signal x(t), wherein the detected signal Ed is one of the first electrodes 111 or the second electrodes 113.

As shown in FIG. 3, the analog front end 133 amplifies and filters the AC detection signal y(t) outputted from the detected electrode Ed to generate a processed detection signal. For example, the analog front end 133 includes an amplification unit which has an operational amplifier 1331, a feedback resistor Rf and a compensation capacitor Cf. The analog front end 133 utilizes the feedback resistor Rf and the output resistor Ri to adjust a signal gain, wherein this adjusting step of the signal gain may be performed before the shipment and is not implemented in the actual operation. Next, a digital back end 135 identifies a touch event according to a peak-to-peak variation of the processed detection signal as shown in FIG. 2.

Figure 6:
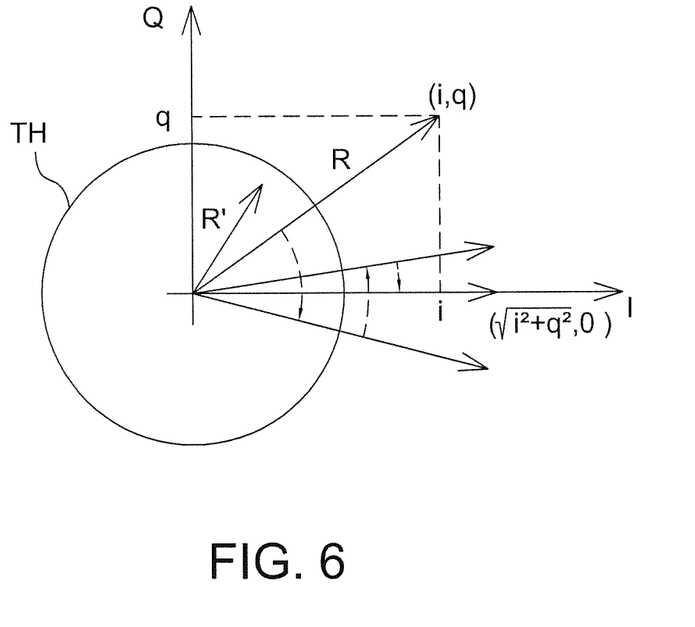
FIG. 6 is an operational schematic diagram of the CORDIC.

In some embodiments, in order to eliminate the influence of the signal phase shift caused by the signal lines, two orthogonal signals $S_1$ and $S_2$ may be used to respectively modulate the processed detection signal to generate two modulated detection signals I and Q. A norm of vector of the two modulated detection signals I and Q is calculated to be served as a touch identification signal, as shown in FIGS. 5A-6. The digital back end 135 identifies a touch event according to a peak-to-peak variation of the touch identification signal. In some embodiments, the step of modulating the processed detection signal may not be implemented, and the digital back end 135 identifies a touch event directly according to a peak-to-peak variation of the processed detection signal.

Figure 8:
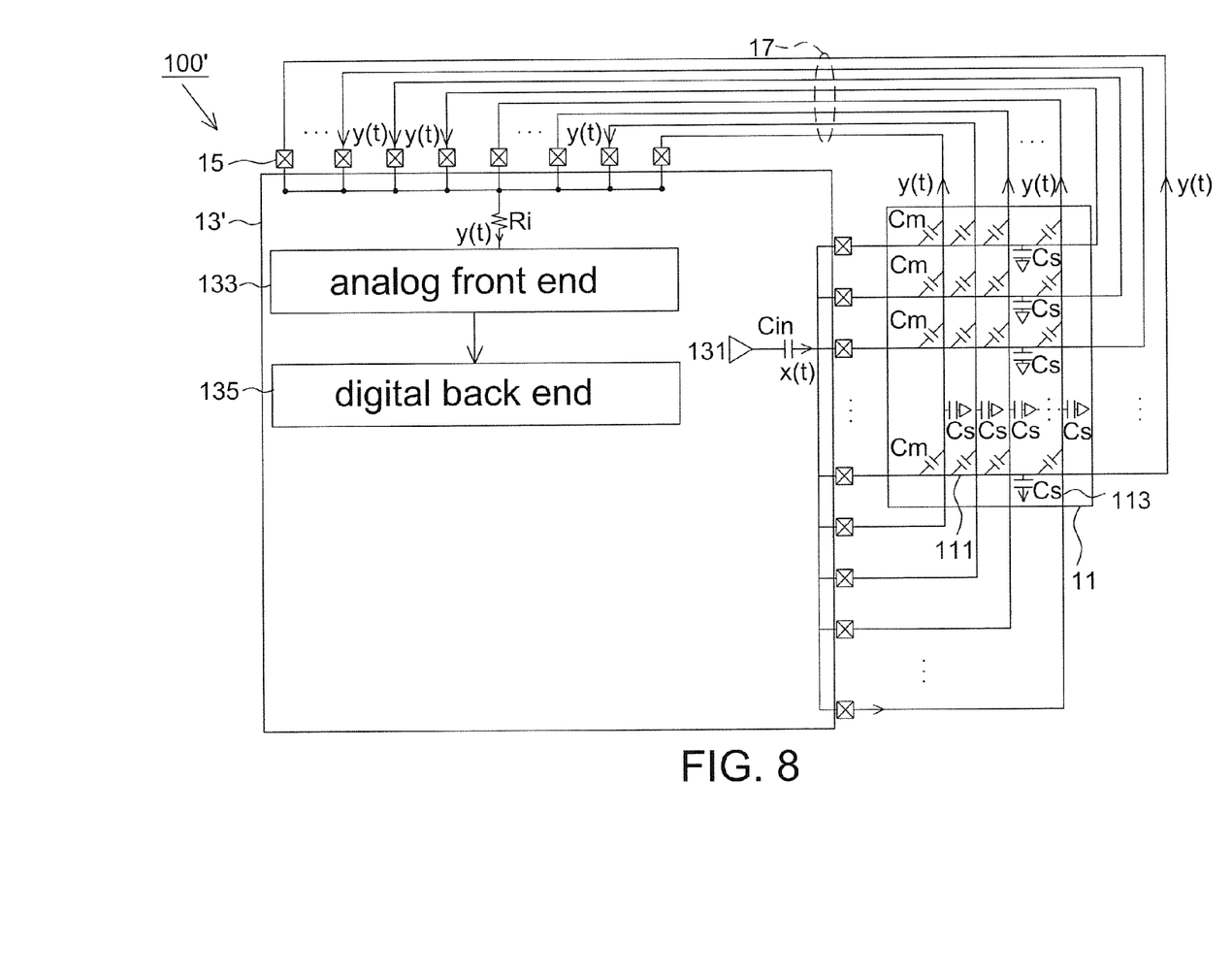
FIG. 8 is a schematic diagram of a capacitive sensing device according to a second embodiment of the present disclosure.

Referring to FIG. 8, it is a schematic diagram of a capacitive sensing device 100' according to a second embodiment of the present disclosure. This embodiment is preferably configured as a proximity sensor but not configured to calculate a touch coordinate. The difference between this embodiment and the first embodiment is that in the second embodiment the controller chip 13' of the capacitive sensing device 100' includes only one input capacitor Cin, one drive circuit 131 and one output resistor Ri.

The capacitive sensing device 100' also includes a touch panel 11 and a controller chip 13', wherein the touch panel 11 includes a plurality of first electrodes 111 and a plurality of second electrodes 113. Since the touch panel 11 is identical to FIG. 1, details thereof are not repeated herein.

The controller chip 13' includes a plurality of pins 15, an input capacitor Cin, a drive circuit 131, an output resistor Ri, an analog front end 133 and a digital back end 135. The controller chip 13' is coupled to the first electrodes 111 and the second electrodes 113 through the pins 15 and a plurality of signal lines 14.

In this embodiment, the input capacitor Cin is simultaneously coupled to signal inputs of the first electrodes 111 and the second electrodes 113 without via a plurality of switching devices. The drive circuit 131 inputs a drive signal x(t) to the first electrodes 111 and the second electrode 113 via the input resistor Cin, wherein the drive signal x(t) has been illustrated in the first embodiment and thus details thereof are not repeated herein. The output resistor Ri is simultaneously coupled to signal outputs of the first electrodes 111 and the second electrodes 113 without via a plurality of switching devices. The self-capacitance Cs of the touch panel 11 induces an AC detection signal y(t) according to the drive signal x(t), wherein said self-capacitance Cs is an equivalent capacitance of the self-capacitance Cs of all electrodes. In this embodiment, as the controller chip 13' also includes the input capacitor Cin and the output resistor Ri, the influence from the mutual capacitance Cm to the detection signal is also cancelled. It is appreciated that values of the input capacitor Cin and the output resistor Ri in the second embodiment may not be identical to those in the first embodiment.

In this embodiment, operations of the analog front end 133 and the digital back end 135 are identical to those in the first embodiment. For example, the analog front end 133 is configured to amplify and filter an AC detection signal y(t) outputted from the output resistor Ri to generate a processed detection signal as shown in FIG. 2. The digital back end 135 modulates the processed detection signal respectively with two orthogonal signals $S_1$ and $S_2$ to generate two modulated detection signals I and Q, and calculates a norm of vector of the two modulated detection signals I and Q to be served as a touch identification signal. The digital back end 135 identifies a touch event according to a peak-to-peak variation of the touch identification signal. In some embodiments, said modulating step of the processed detection signal may not be implemented, and the digital back end 135 identifies a touch event directly according to a peak-to-peak variation of the processed detection signal.

In some embodiments, in the mutual capacitance mode the first electrodes 111 are configured as receiving electrodes for outputting detection signals y(t), whereas the second electrodes 113 are configured as drive electrodes for receiving drive signals s(t).

It should be mentioned that FIGS. 1 and 8 are only intended to illustrate but not to limit the present disclosure. For example, positions of the pins 15 of the controller chips 13 and 13', the arrangement of the signal lines 17, and scales of the elements are not limited to those shown in the figures and may be determined according to actual applications.

It should be mentioned that in the present disclosure, the analog front end 133 and the digital back end 135 may include other elements to perform other functions, and elements not directly related to the present disclosure are omitted.

As mentioned above, as the operation in the self-capacitance mode of the conventional dual-mode capacitive sensing device is easily affected by the mutual capacitance, the detection accuracy is degraded. Therefore, the present disclosure further provides a capacitive sensing device (FIGS. 1 and 8) and an operating method thereof (FIG. 7) that further arrange a voltage division capacitor in a controller chip thereof so as to detect the touch event based on the voltage division. Furthermore, a balancing resistor is further arranged in the controller chip thereof so as to form a bridge circuit with the voltage division capacitor and a mutual capacitance thereby eliminating the influence from the mutual capacitance, such that higher detection accuracy is realized.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive sensing device comprising:
   a touch panel comprising a plurality of first electrodes and a plurality of second electrodes; and
   a controller chip comprising:
      an analog front end;
      a plurality of input capacitors respectively configured to be coupled to signal inputs of the first electrodes and the second electrodes;
      a plurality of drive circuits configured to simultaneously input a drive signal to the first electrodes and the second electrodes respectively via the input capacitors; and
      a plurality of output resistors respectively configured to be coupled to signal outputs of the first electrodes and the second electrodes,
      wherein in a self-capacitance mode the output resistor corresponding to a detected electrode is coupled to the analog front end and rest of the output resistors are coupled to a constant voltage source.

2. The capacitive sensing device as claimed in claim 1, wherein the analog front end further comprises an amplification unit, and the amplification unit comprises:
   an operational amplifier having a positive input, a negative input and an output;
   a feedback resistor connecting between the negative input and the output of the operational amplifier; and
   a compensation capacitor connecting between the negative input and the output of the operational amplifier, wherein the negative input is coupled to the output resistor corresponding to the detected electrode, and the positive input is coupled to the constant voltage source.

3. The capacitive sensing device as claimed in claim 2, wherein the feedback resistor and the output resistor corresponding to the detected electrode are configured to adjust a signal gain.

4. The capacitive sensing device as claimed in claim 1, wherein in a mutual capacitance mode the input capacitors are bypassed.

5. The capacitive sensing device as claimed in claim 1, wherein the drive signal is an AC signal and the detected electrode outputs an AC detection signal.

6. The capacitive sensing device as claimed in claim 5, wherein the analog front end is configured to amplify and filter the AC detection signal and output a processed detection signal.

7. The capacitive sensing device as claimed in claim 6, wherein the controller chip further comprises:
   a digital back end configured to modulate the processed detection signal respectively with two orthogonal signals to generate two modulated detection signals, and calculate a norm of vector of the two modulated detection signals configured as a touch identification signal.

8. The capacitive sensing device as claimed in claim 6, wherein the controller chip further comprises:
   a digital back end configured to identify a touch event according to a peak-to-peak variation of the processed detection signal.

9. The capacitive sensing device as claimed in claim 1, wherein mutual capacitance is formed between the first electrodes and the second electrodes, and the detected electrode is one of the first electrodes or the second electrodes.

10. An operating method of a capacitive sensing device, the capacitive sensing device comprising a touch panel and a controller chip, wherein the touch panel comprises a plurality of first electrodes and a plurality of second electrodes, the controller chip comprises a plurality of output resistors and an analog front end, and the output resistors are respectively coupled to signal outputs of the first electrodes and the second electrodes, the operating method comprising:
   coupling, in a self-capacitance mode, the output resistor corresponding to a detected electrode to the analog front end and coupling rest of the output resistors to a constant voltage source; and
   sequentially coupling, in a mutual capacitance mode, the output resistors to the analog front end.

11. The operating method as claimed in claim 10, wherein the controller chip further comprises a plurality of input capacitors, and in the self-capacitance mode further comprises:
   simultaneously inputting a drive signal to signal inputs of the first electrodes and the second electrodes respectively via the input capacitors.

12. The operating method as claimed in claim 11, wherein in the self-capacitance mode further comprises:
   bypassing the input capacitors.

13. The operating method as claimed in claim 10, further comprising:
   amplifying and filtering an AC detection signal outputted by the detected electrode to generate a processed detection signal.

14. The operating method as claimed in claim 13, further comprising:
   modulating the processed detection signal respectively with two orthogonal signals to generate two modulated detection signals; and
   calculating a norm of vector of the two modulated detection signals configured as a touch identification signal.

15. The operating method as claimed in claim 13, further comprising:
   identifying a touch event according to a peak-to-peak variation of the processed detection signal.

16. The operating method as claimed in claim 10, wherein the analog front end comprises an operational amplifier and a feedback resistor connecting between a negative input and an output of the operational amplifier, and the operating method further comprises:

adjusting a signal gain by changing the feedback resistor and the output resistor.

17. A capacitive sensing device comprising:

a touch panel comprising a plurality of first electrodes and a plurality of second electrodes; and a controller chip comprising:

an input capacitor simultaneously coupled to signal inputs of the first electrodes and the second electrodes;

a drive circuit configured to input a drive signal to the first electrodes and the second electrodes via the input capacitor; and an output resistor simultaneously coupled to signal outputs of the first electrodes and the second electrodes.

18. The capacitive sensing device as claimed in claim 17, wherein the drive signal is an AC signal, and the capacitive sensing device further comprises:

an analog front end configured to amplify and filter an AC detection signal outputted from the output resistor to generate a processed detection signal.

19. The capacitive sensing device as claimed in claim 18, further comprising:

a digital back end configured to modulate the processed detection signal respectively with two orthogonal signals to generate two modulated detection signals, and calculate a norm of vector of the two modulated detection signals configured as a touch identification signal.

20. The capacitive sensing device as claimed in claim 19, further comprising:

a digital back end configured to identify a touch event according to a peak-to-peak variation of the touch identification signal.

21. A controller chip adaptable to a capacitive sensing device, comprising:

a plurality of pins configured as an interface to external circuits;

an analog front end;

a plurality of input capacitors respectively configured to be coupled to a first part of the plurality of pins;

a plurality of drive circuits respectively configured to input a drive signal to the input capacitors;

a plurality of output resistors respectively configured to be coupled to a second part of the plurality of pins, wherein in a self-capacitance mode, one of the output resistors is coupled to the analog front end and rest of the output resistors are coupled to a constant voltage source; in a self-capacitance mode, the output resistors are sequentially coupled to the analog front end and the input capacitors are bypassed.

* * * * *